United States Patent [19]

Chan

[11] Patent Number: 5,278,957
[45] Date of Patent: Jan. 11, 1994

[54] DATA TRANSFER CIRCUIT FOR INTERFACING TWO BUS SYSTEMS THAT OPERATE ASYNCHRONOUSLY WITH RESPECT TO EACH OTHER

[75] Inventor: Stephen H. Chan, Sunnyvale, Calif.

[73] Assignee: Zilog, Inc., Campbell, Calif.

[21] Appl. No.: 686,244

[22] Filed: Apr. 16, 1991

[51] Int. Cl.[5] .................................................. G06F 13/00
[52] U.S. Cl. ................................. 395/250; 395/725;
  314/DIG. 1; 314/238.6; 314/239; 314/239.1;
  314/239.5; 314/240; 314/242.6; 314/245;
  314/246; 314/246.1; 314/260; 314/70.5
[58] Field of Search ............... 395/250, 400, 425, 550,
  395/725, 325; 364/DIG. 1, DIG. 2; 365/189

[56] References Cited

U.S. PATENT DOCUMENTS

| | | | |
|---|---|---|---|
| 4,141,039 | 2/1979 | Yamamoto | 358/127 |
| 4,183,058 | 1/1980 | Taylor | 358/134 |
| 4,415,994 | 11/1983 | Ive et al. | 365/189 |
| 4,423,482 | 12/1983 | Hargrove et al. | 395/325 |
| 4,463,443 | 7/1984 | Frankel et al. | 395/250 |
| 4,486,854 | 12/1984 | Yuni | 395/425 |
| 4,642,797 | 2/1987 | Hoberman | 395/325 |
| 4,649,512 | 3/1987 | Nukiyama | 395/325 |
| 4,894,797 | 1/1990 | Walp | 395/425 |
| 5,003,461 | 3/1991 | Fritsche | 395/425 |
| 5,058,054 | 10/1991 | Feldman | 395/550 |
| 5,164,970 | 11/1992 | Shin et al. | 377/54 |

Primary Examiner—Michael R. Fleming
Assistant Examiner—Ayaz R. Sheikh
Attorney, Agent, or Firm—Majestic, Parsons, Siebert & Hsue

[57] ABSTRACT

A circuit for transferring data from one bus system to another is disclosed. The circuit allows the write bus to perform write operations indiscriminately of any handshaking, wait states or other control signals which would otherwise reduce the bus efficiency of the system. Similarly, the read bus system has no handshaking or wait states but is provided with a data ready signal to indicate when valid data may be read. This circuit is used in applications where less than 100% data integrity is permissible.

30 Claims, 3 Drawing Sheets

DATA TRANSFER CIRCUIT FOR INTERFACING TWO BUS SYSTEMS THAT OPERATE ASYNCHRONOUSLY WITH RESPECT TO EACH OTHER

BACKGROUND OF THE INVENTION

This invention relates generally to a circuit for arbitrating between two bus systems and, more specifically, to controlling the writing by one bus system to a second bus system.

Different arbitration schemes exist for coordinating the transfer of data from a first bus system to a second bus system. Such arbitration schemes must insure that the write data bus does not overwrite previously written data and that the read data bus only reads valid data. In order to prevent the write data bus from overwriting previous data, traditional arbitration schemes sometimes use handshaking control signals to regulate the write operations.

Another traditional arbitration scheme uses a control signal to force the write bus system to suspend a write operation. Where the write bus system is controlled by a microprocessor, this suspension of the microprocessor is achieved by using "wait states." The read bus system can be controlled in a similar manner by using either handshaking signals or suspension of processing to prevent the read data bus from receiving invalid data.

However, each of the above arbitration schemes has a drawback in that the maximum number of bus operations possible per second for each bus system is decreased due to the delay in either acknowledging the handshake control signal or in the suspension of the processor by forced wait states. In most bus systems, such bus efficiency degradation is acceptable as a design trade-off toward achieving data integrity.

However, in data systems where some data losses are acceptable, it is preferable to maintain the highest bus operation rate possible. For example, in digitized voice data transmissions less than 100% data integrity will be acceptable because a sample lost will only mean a slight, often undetectable, degrading of the voice quality. If desired, processing techniques such as interpolation can be used to compensate for the error. Similarly, the transmission of digitized pictures for human viewing will have a certain allowable data loss. Another example would be in communications systems where error detection and correction is built in, as by using coding schemes or providing for the retransmission of a message in error.

In such data systems, an arbitration scheme need not be concerned with delaying the writing or reading of data in an attempt to ensure 100% data integrity. It is therefore an objective of this invention to provide an arbitration scheme that allows a first data bus to write to a second data bus without delaying the operation of the writing data bus. A second objective of the invention is to make known to the reading data bus when a data overrun condition occurs, so that corrective measures can be taken. A third objective is to implement the arbitration scheme in a cost effective and efficient electronic circuit.

SUMMARY OF THE INVENTION

The present invention uses two banks of latches to buffer data from the write data bus to the read data bus. Data is written from the write data bus into the first bank of latches and is held at the first bank of latches, if necessary, until the read data bus has completed reading previous data from the second bank of latches. The data is then loaded from the first bank of latches to the second bank of latches. This arbitration scheme allows the write data bus to write to the first bank of latches independently of the read bus system.

The arbitration circuit of the present invention provides control signals to the read data bus so that the read data bus will not obtain invalid data. The arbitration circuit also reduces the possibility of spurious transitions on critical control signals to further minimize the data errors. These spurious signals can occur when the control signals are derived from a combination of signals from both the write bus and read bus where the two busses are operating asynchronously.

In the present invention, when a data error does occur it will be the loss of a complete data word rather than the reading of a completely unpredictable data value. That is, data will be "dropped" rather than "corrupted." In data systems such as those discussed above, such dropping of data is negligible to the functioning of the system.

Additional objects, advantages and features of the various aspects of the present invention will become apparent from the following description of a preferred embodiment thereof, which description should be taken in conjunction with the accompanying drawings.

DESCRIPTION OF A PREFERRED EMBODIMENT

Figure 1:
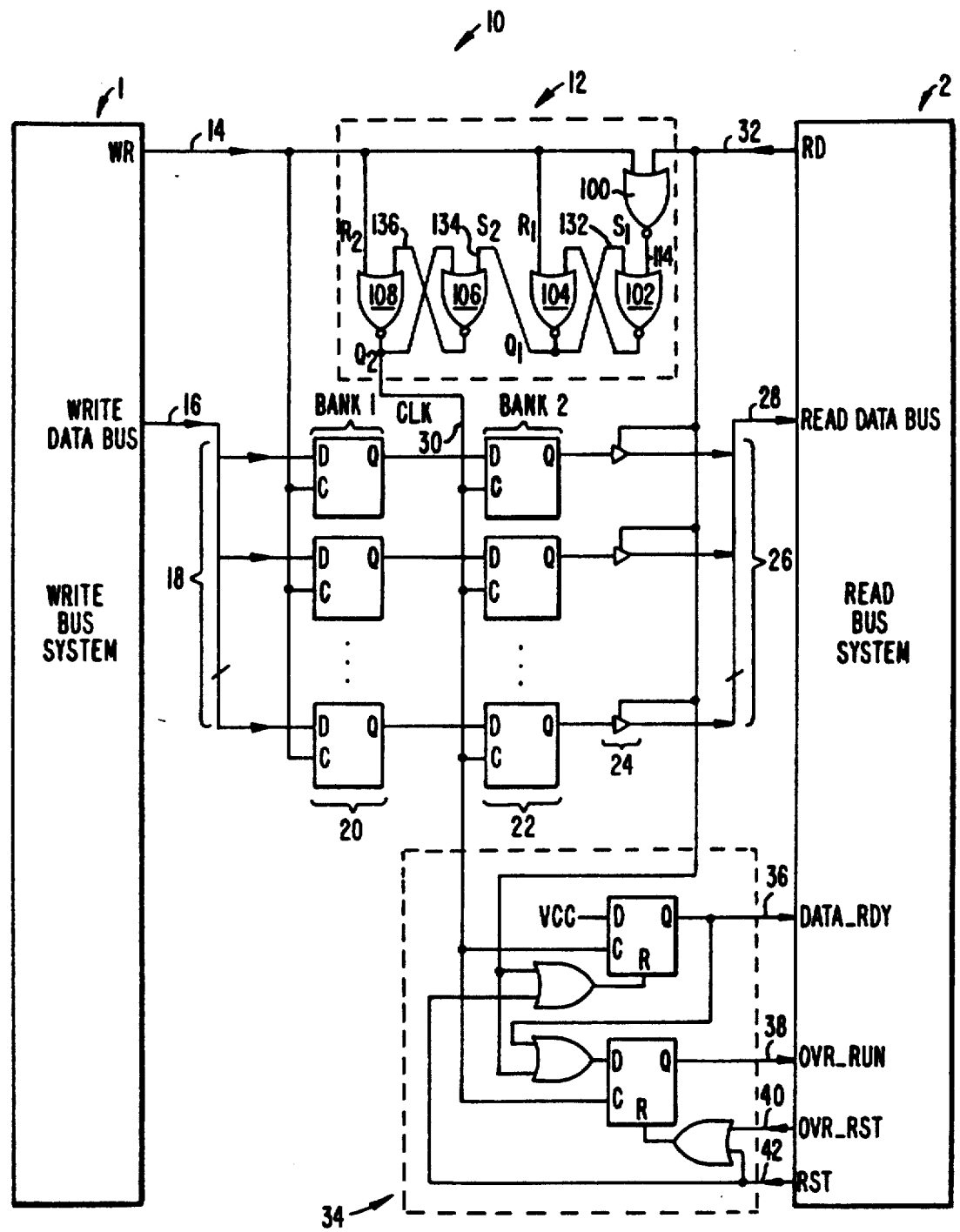
FIG. 1 is a schematic diagram illustrating the arbitration circuit.

FIG. 1 is a schematic diagram of the arbitration circuit 10 shown connected to a write bus system 1 and a read bus system 2. Write bus system 1 has a write control signal 14 designated WR and a write data bus 16 which includes any number of write data lines 18.

Write data lines 18 are connected to bank 1 latches 20. As shown in FIG. 1, bank 1 latches 20 are D-type latches although any suitable latch or flip-flop may be used for this function. As shown in FIG. 1, each of write data lines 18 is an input to one of the bank 1 D-type latches 20. Signal WR is connected to the clock inputs of the bank 1 latches designated "C".

During a write operation, write data bus 1 places data on the write data lines 18 and pulls signal WR high to indicate a write operation. Write bus system 1 shortly thereafter will allow signal WR to fall low. Bank 1 latches 20 can latch the write data during the interval when WR is high or at the falling edge of WR. However, it is preferable to implement the bank 1 latches with clock level sensitive D-type latches because of their cost and fabrication advantages over other types of latches. Therefore, with a level sensitive clock signal, the data at the inputs of the bank 1 latches' flip-flops will be passed to the outputs while the clock is high and the data will be latched into the bank 1 latches at the falling edge of WR.

The outputs of the bank 1 latches are connected to the inputs of the bank 2 latches 22. Here, the bank 2 latches are also implemented with D-type latches. The outputs of bank 2's latches are connected to output buffers 24, which drive the signals onto the read data lines 26 which comprise the read data bus 28 of read bus system 2.

As shown in FIG. 1, write signal WR is connected to the circuitry of functional block 12. Functional block 12 generates the clock signal 30, designated LK in FIG. 1, for the bank 2 latches 22 by using the write control signal 14 and the read control signal 32. The operation of the circuitry in functional block 12 will be described in detail below.

Read bus system 2 will pull the read signal RD high during a read cycle. While RD is high, the data from the outputs of bank 2 latches are passed along to the read data lines 26. These data are sampled by read bus system 2, generally slightly before, or at the RD signal falling edge.

Functional block 34 generates various signals to be used by read bus system 2. These signals are generated from read control signal (RD) 32 and the clock (CLK) 30. The signal "data ready" (DATA_RDY) 36 when high indicates to read bus system 2 that data is available to be read. The signal "overrun" (OVR_RUN) 38 indicates to read bus system 2 that the write bus system 1 has overwritten data before the overwritten data had been read by read bus system 2. In other words, an error has occurred and data has been lost.

The "overrun reset" signal (OVR_RST) 40 is an input to the functional block 34. The purpose of the overrun reset signal is to reset the overrun signal back to low. The reset signal (RST) 42 resets both the "overrun" and "data ready" signals to low. The generation of signals such as "data ready" and "overrun," and the implementation of the "overrun reset" and "reset" lines is well-known to one of skill in the art, and functional block 34 can be implemented by traditional methods.

CIRCUIT OPERATION

Write Completes before Read Starts

Figure 2:
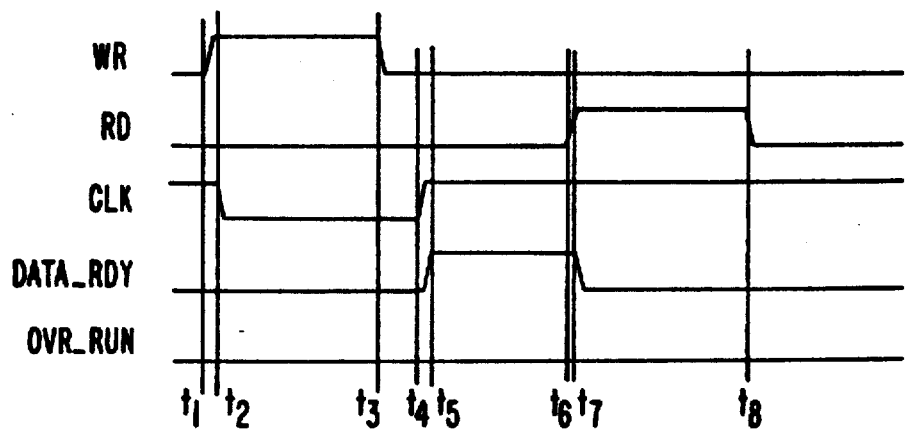
FIG. 2 is a timing diagram of the signals in the circuit of FIG. 1 during a first transaction.

FIG. 2 shows a timing diagram of selected signals in the circuit of FIG. 1 in the case where the write completes before the read starts. As can be seen from FIG. 2, at time $t_1$, signal WR goes from low to high indicating the start of a write cycle. Shortly thereafter, at time $t_2$, the signal CLK goes from high to low.

The interval $t_2$-$t_1$ is due to the generation of the signal CLK in response to the change in WR. This interval will be approximately one gate delay if the circuit implementing functional block 12 is as shown in FIG. 1.

When WR goes high, the signals at the inputs to the bank 1 latches 20, that is, the write data lines 18, will be passed to the outputs of the bank 1 latches and thus to the inputs of the bank 2 latches. However, the write data signals will incur a delay in propagating through the bank 1 latches. This delay will be greater than the delay between WR going high (at $t_1$) and CLK going low (at $t_2$). When CLK goes low, the bank 2 latches will be disabled. Therefore, the new data at the write data lines 18 will not be latched into the bank 2 latches, because the bank 2 latches will be disabled by CLK going low and any previously unread data will be retained at the outputs of the bank 2 latches to be subsequently read by the read bus system.

At time $t_3$, WR goes low, indicating the completion of the write cycle. Since WR is connected to the clock signals of the bank 1 latches, the bank 1 latches' inputs will no longer be passed to the bank 1 outputs. Instead, data on the write data lines 18 will be latched to the outputs of the bank 1 latches 20.

At time $t_4$, the signal CLK changes from low to high in response to signal WR going low. Since the signal CLK is connected to the clock signal of the bank 2 latches, the data at the inputs to the bank 2 latches, i.e., the data at the output of the bank 1 latches, is now passed to the outputs of the bank 2 latches. Thus, the data written by write bus system 1 during the aforementioned write cycle is present at the outputs of the bank 2 latches. A short time after $t_4$, at time $t_5$, signal DATA_RDY goes from low to high, indicating to read bus system 2 that valid data is available. The read cycle begins at time $t_6$, when RD goes high. In response to this, DATA_RDY goes low at time $t_7$.

The read cycle continues so long as signal RD is high. Signal RD goes low at time $t_8$, indicating the end of the read cycle. Read bus system 2 will typically sample the data on read data lines 26, at, or slightly before the falling edge of signal RD.

Read is Active when Write Completes

Figure 3:
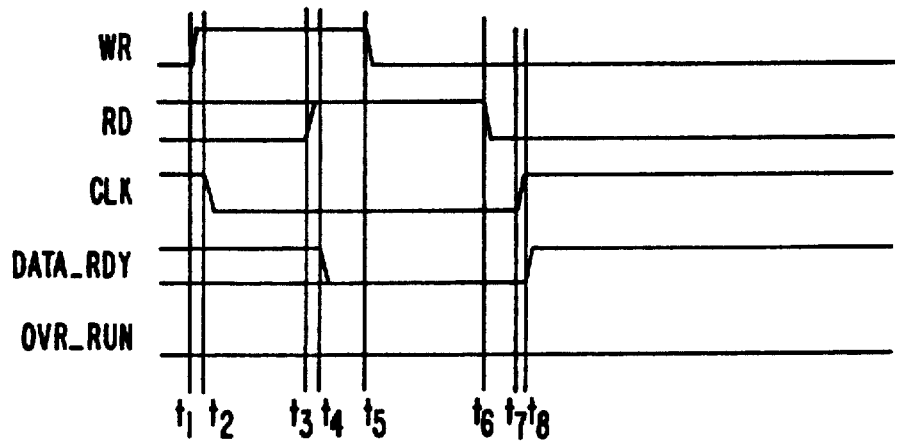
FIG. 3 is a timing diagram of the signals in the circuit of FIG. 1 during a second transaction.

FIG. 3 shows a second transaction where the read is active when write completes. FIG. 3 shows a timing diagram corresponding to the same signals as shown in FIG. 2 for the circuit of FIG. 1. In FIG. 3 at time $t_1$, the write signal WR again goes high. One gate delay later, at time $t_2$, signal CLK again goes low in response to signal WR going high. Signal WR goes low at time $t_5$. Sometime before $t_5$, signal RD is assumed to be high, as, for example, at time $t_3$. DATA_RDY goes low at $t_4$ in response to RD going high. Signal RD remains high through time $t_5$, to go low at a later time $t_6$.

As in the timing diagram of FIG. 2, when signal RD goes high, a short time later, signal DATA_RDY goes low at time $t_4$. However, unlike the timing diagram in FIG. 2, the signal CLK remains low throughout the intervals of either or both of signals WR or RD being high. This is necessary to prevent the data at the bank 2 latches' outputs from being overwritten by the write data during the write cycle $t_5$-$t_1$. By keeping the signal CLK low, the write data will be latched into the bank 1 latches, but will not be latched into the bank 2 latches.

This can be seen by referring to FIG. 1. The signal CLK is connected to the clock inputs of the bank 2 latches, and the bank 2 latches will not pass data from their data inputs to their outputs unless their clock signals are high. At time $t_6$, the read cycle ends, and signal RD goes low. A short time later, at $t_7$, the signal CLK goes high, allowing the data written during the write cycle $t_5$-$t_1$ to be latched from the bank 1 latches' outputs to the bank 2 latches' outputs. Later, at time $t_8$, DATA_RDY goes high to indicate to the read bus system 2 that another valid data is available.

Write Completes when Read Starts

Figure 4:
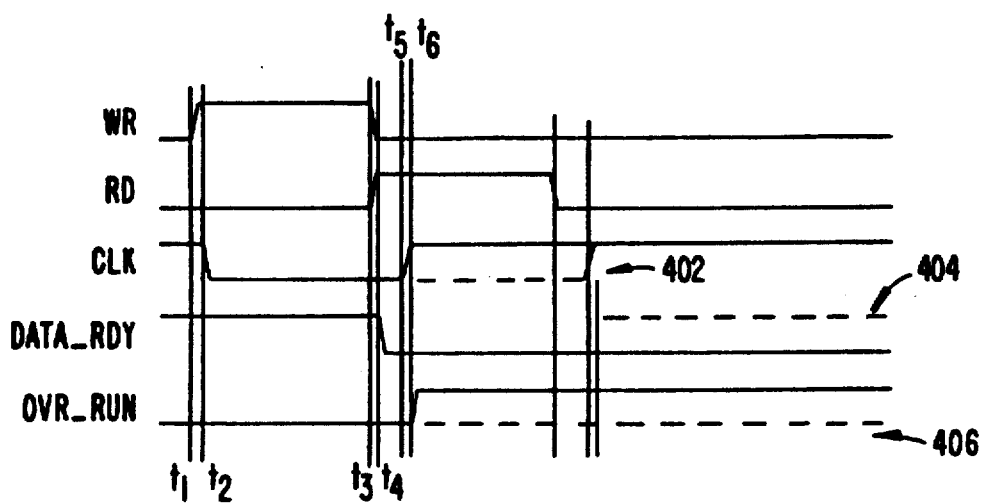
FIG. 4 is a timing diagram of the signals in the circuit of FIG. 1 during a third transaction.

FIG. 4 illustrates the case where a write completes at about the same time that a read starts. In FIG. 4, it is assumed that valid data exists at the outputs of the bank 2 latches. This is indicated by signal DATA_RDY being high, indicating that data is available to be read. At time $t_1$, signal WR goes high. A short time later, at time $t_2$, signal CLK goes low. The signal CLK is the clock signal for the bank 2 latches. When the clock signal is high, the inputs of the bank 2 latches are passed to the outputs of the bank 2 latches. When the signal CLK transitions from high to low, the outputs of the bank 2 latches are latched, preventing any further change of the bank 2 latches' outputs in response to the bank 2 latches' inputs. Referring to FIG. 1, signal CLK 30 will go low and latch the outputs of the bank 2 latches 22. Signal WR, which is connected to the clock input of the bank 1 latches, allows new data to be passed from the inputs of the bank 1 latches to the outputs of the bank 1 latches. This means that while signal WR is high, new data is present at the inputs of the bank 2 latches while the old, as yet unread, data is latched at the outputs of the bank 2 latches.

At time $t_3$, signal WR goes low. Also, at about the same time, signal RD is shown going high. If signal RD goes high slightly before signal WR goes low, NOR-gate 100 is forced at logic low. In this case, the operation is identical to that of FIG. 3, and the signals CLK, DATA_RDY and OVR_RUN waveforms are depicted in FIG. 4 as dashed lines 402, 404, and 406, respectively.

If signal WR goes low slightly before signal RD goes high, NOR-gate 100 produces a narrow logic high pulse. If this pulse width is insufficient to change the logic states of the cross-coupled NOR-gates 102 and 104, operations again revert to those in FIG. 3 as shown by the dashed lines of FIG. 4.

If the NOR-gate 100 pulse width is sufficient to change the logic states of the cross-coupled NOR-gates 102 and 104, then the logic high of NOR-gate 104 causes signal CLK to go high through NOR-gates 106 and 108. This is when data overrun occurs, since the read bus system is reading the bank 2 latches while their previous contents are being replaced. The signal OVR_RUN indicates this condition to the read bus system. This error case is shown in FIG. 4 by the solid lines for the signals CLK, DATA_RDY and OVR_RUN.

In the case of an overrun error, the old data present at the outputs of the bank 2 latches would be overwritten by the new data before the read bus system has read the old data. This results in the loss of a data word, but not in the reading of an erroneous value. In a system such as one which would transfer digitized voice data, the read bus system can interpolate the overrun sample to compensate for the lost data.

Generation of CLK

In FIG. 1, functional block 12 is a logic means for generating the signal CLK from the signals WR and RD. In FIG. 1, the logic means comprises the five NOR-gates 100, 102, 104, 106 and 108. The circuit shown by functional block 12 is used to generate the signal CLK such that CLK functions in accordance with the previous discussion of FIGS. 2 through 4.

Signals WR and RD are connected to the inputs of NOR-gate 100. The output of NOR-gate 100 is connected to the input of NOR-gate 102. It is helpful to think of NOR-gates 102 and 104 as forming an SR flip-flop, with the output of this SR flip-flop going to NOR-gate 106. Similarly, it is helpful to view NOR-gates 106 and 108 as forming a second SR flip-flop with the output of this second SR flip-flop as being the signal CLK. The functioning of an SR flip-flop is well-known, and the truth table is shown below.

| S | R | Q |
|---|---|---|
| 0 | 1 | 0 |
| 1 | 0 | 1 |
| 1 | 1 | 0 |
| 0 | 0 | $Q_0$ |

As is shown by the truth table, when the R input is high and the S input is low, the output Q is low. When the S input is high and the R input is low, the output Q is high. When both S and R are low, the output Q is unaffected, having the same state it had previously. For the disclosed circuit, when both S and R are high, the output Q will be low.

As shown by FIG. 1, the output 114 of NOR-gate 100 is connected to the S input of the SR flip-flop comprised of NOR-gates 102 and 104. The $R_1$ input to this SR flip-flop is signal WR. The output $Q_1$ of this SR flip-flop is connected to the $S_2$ input of the SR flip-flop comprised of NOR-gates 106 and 108. The $R_2$ input to this second SR flip-flop is signal WR, and the $Q_2$ output of this second SR flip-flop is the signal CLK.

When both signals WR and RD are low, the output 114 of NOR-gate 100 will be high. This forces the output of NOR-gate 102 low, which in turn brings one of the inputs of NOR-gate 104 low. The other input of NOR-gate 104 is connected to signal WR, which is given to be low. Thus, the output of NOR-gate 104 is high. Since the output of NOR-gate 104 is connected to one of the inputs of NOR-gate 106, the output of NOR-gate 106 will be low, thus forcing one of the inputs of NOR-gate 108 low. The other input of NOR-gate 108 is the signal WR, given to be low, so that the output of NOR-gate 108 will be high. This means that logically when both signals WR and RD are low, the signal CLK will be high in accordance with the discussion of signals WR, RD and CLK above, as illustrated by FIGS. 2 through 4.

When signal WR is high, then regardless of the state of signal RD, signal CLK will be low since signal WR is connected to one of the inputs of NOR-gate 108 and the output of NOR-gate 108 is the signal CLK.

When the signal RD is high, signal CLK will be either high or low, depending on whether signal RD has gone high while signal WR was high. That is, if signal RD goes high while signal WR is high, signal CLK will remain low. On the other hand, if signal RD goes high while signal WR is low, signal CLK will remain high (remembering that signal CLK must be high when both WR and RD are low, which would be the case prior to signal RD going high when signal WR was low).

Assuming the case where WR is high when signal RD goes high, it can be seen that the signal CLK will be low since WR is connected to the R inputs of both SR flip-flops. If signal RD goes high while signal WR is high, then even when signal WR goes low, the signal CLK will remain low. This is readily seen by noting that the output 114 of NOR-gate 100 will remain low due to the high input from signal RD. Then both inputs $S_1$ and $R_1$ of the flip-flop comprised of NOR-gates 102 and 104 will be low, hence the output $Q_1$ will be unchanged, remaining at a low. Since $Q_1$ is connected to $S_2$, and $R_2$ is connected to signal WR, both $S_2$ and $R_2$ of the flip-flop comprised of NOR-gates 106 and 108 are also low, which means that the signal $Q_2$ will remain unchanged and be low. Signal $Q_2$ is connected to signal CLK, hence signal CLK remains low regardless of signal WR going low, as long as signal RD has gone high while signal WR was high, and as long as signal RD then remains high.

When signal RD goes low, the output 114 of NOR-gate 100 will go high, putting the input $S_1$ high. With the $S_1$ input high, the output $Q_1$ will go high. Since $Q_1$ is connected to $S_2$, $S_2$ will go high, causing output $Q_2$ and signal CLK to go high.

If signal RD goes high while signal WR is low, the signal CLK will be unchanged. This can be seen by noting that when signal WR is low, the effect of RD going high is to change the input $S_1$ of the first flip-flop from a high to a low. According to the truth table for an SR flip-flop, the effect of changing the signal $S_1$ from high to low will have no effect on changing the output. Since the output $Q_1$ will not change, the inputs to the second flip-flop $S_2$ and $R_2$ also will not change. Therefore, the output $Q_2$ of the second flip-flop, which is also the signal CLK, will remain unchanged.

Figure 5:
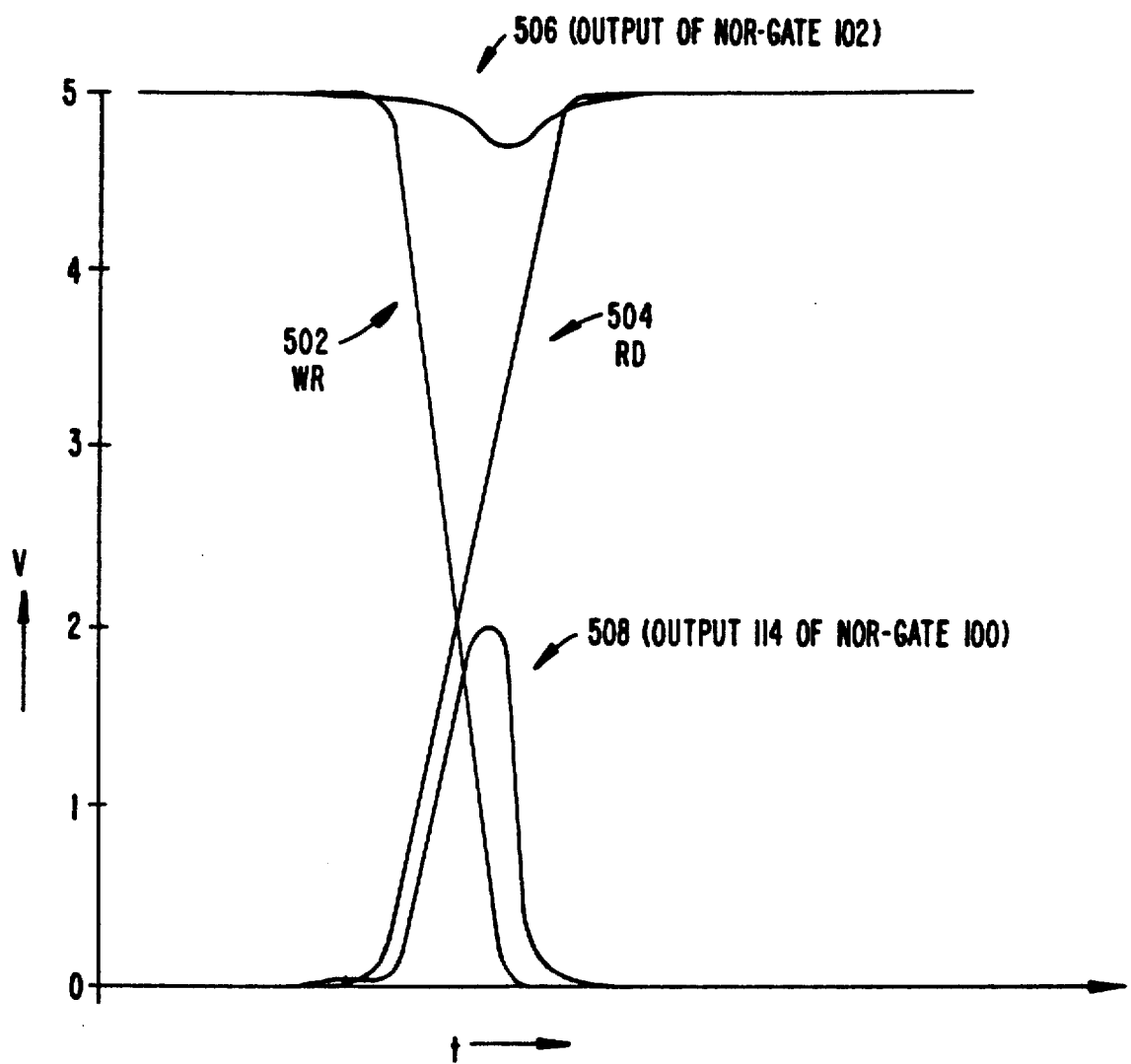
FIG. 5 is a diagram showing voltages varying with time for selected signals in the circuit of FIG. 1.

The purpose of connecting the output $Q_1$ to the input $S_2$ is to ensure that the signal CLK will not be sensitive to the relative timings of signals WR and RD changing states. FIG. 5 is a timing diagram of various signals within the circuit of functional block 12 to illustrate this principle. The timing diagram of FIG. 5 was plotted from a computer simulation of the operation of the circuit of functional block 12. Curve 502 corresponds to WR going from high to low. Curve 504 corresponds to RD going from low to high at about the same time, but slightly after WR has changed from high to low.

Curve 508 is the output 114 of NOR-gate 100, which can be seen to have risen from a low state to about one-third of the way towards a high state, before falling back down to a low state. This change in the output of NOR-gate 100 designated by curve 508 is due to the short time that neither signals WR nor RD are at a high level. The output 114 is connected to the input of NOR-gate 102, and the output of NOR-gate 102 is designated by the curve 506 of FIG. 5.

As can be seen, the perturbation in the curve 508 has affected the output of NOR-gate 102 to a small degree, serving to reduce the level of the output from logic high to about 90 percent of logic high, before returning back to logic high. Since the output of NOR-gate 102 is connected to the input of NOR-gate 104, and the output of NOR-gate 104 is the output $Q_1$ of the first SR flip-flop, the fluctuation of the output of NOR-gate 102 shown by curve 506 will also affect the output $Q_1$ of the SR flip-flop. Conceivably, if these fluctuations are large enough, they could cause a logic swing at the output of the first SR flip-flop.

By cascading the output of the first SR flip-flop (NOR-gates 102 and 104) with the input of the second SR flip-flop (NOR-gates 106 and 108), it is guaranteed that these perturbations will be too small to cause the second SR flip-flop to latch up, that is, to cause the output $Q_2$ of the SR flip-flop to change states. Therefore, this cascading is a means of insuring that the signal CLK will not change spuriously in response to the signals WR and RD changing states substantially at the same time.

A further way to ensure that the signal CLK will not undergo spurious changes is to adjust the switch points of the NOR-gates 102, 106 and 108. The switch point of a NOR-gate is the voltage at which a changing input equals the changing output, where the output is changing in response to that input. In other words, given a two input NOR-gate with the first input fixed at logic low, when the second input changes from low to high the output of the NOR-gate will change from high to low. Since these two changes are occurring essentially at the same time, they will "cross" each other if the voltage changes are plotted with respect to time. The voltage point at which the input and output voltages are equal (i.e., cross each other) is called the switch point.

In the circuit of functional block 12, by making the input 132 of NOR-gate 102 have a lower switch point than the input 134 of NOR-gate 106, when the signal WR goes from high to low and the signal RD goes from low to high it is ensured that the first SR flip-flop will latch up before the second SR flip-flop's output changes. The other NOR-gates' input can be designed with switch points somewhere between those of the inputs 132 and 134. Additional setting of switch points in order to further ensure that the signal CLK is immune to spurious signals are possible. For example, by lowering the switch point of the input 136 of NOR-gate 108, the second SR flip-flop is further immune to spurious pulses at its $S_2$ input. All such combinations of switch points are within the scope of the invention.

The foregoing description of a preferred embodiment has disclosed a circuit which transfers data from one bus to another. If two-way data transfer is desired so that either of the two busses may write and read from one another, the present invention would be replicated so that, in effect, there would be a use of the invention in each direction.

The description of the preferred embodiment of this invention is given for purposes of explaining the principles thereof, and is not to be considered as limiting or restricting the invention since many modifications may be made by the exercise of skill in the art without department from the scope of the invention.

It is claimed:

1. A circuit for transferring data from a write bus system having a plurality of outputs to a read bus system having a plurality of inputs and a plurality of outputs, wherein the write bus system includes means for providing a write pulse to said circuit for indicating a write operation therefrom, and the read bus system includes means for providing a read pulse to said circuit for indicating a read operation thereto, said circuit comprising:

logic means connected to receive said write pulse and said read pulse for generating a control signal that is derived exclusively from said write and read pulses;

a first latching means having a first plurality of data inputs connected to the write bus system, a first plurality of clock inputs connected to receive said write pulse, and a first plurality of data outputs, wherein the first latching means is responsive to the write pulse for latching and passing data from said first plurality of data inputs to the first plurality of data outputs; and a second latching means having a second plurality of data inputs communicating with said first latching means, a second plurality of clock inputs connected to receive said control signal, and a second plurality of data outputs communicating with said read bus system, wherein the second latching means is responsive to said control signal for latching and passing data from said second plurality of data inputs to the second plurality of data outputs.

2. The circuit of claim 1, wherein the write pulse occurs asynchronously with respect to the read pulse.

3. The circuit of claim 2, wherein the write bus system operates asynchronously with respect to the read bus system.

4. The circuit of claim 1, wherein the maximum rate of bus operations of the write bus system is not decreased by the operation of the circuit.

5. The circuit of claim 1, wherein the write bus system has a write cycle time defined as an interval between the initiation of the writing of a first datum to the circuit and the completion of the writing of that first datum to the circuit, wherein the read bus system has a read cycle time defined as an interval between the initiation of the reading of a second datum from the circuit and the completion of the reading of that second datum from the circuit, and wherein the circuit does not extend either the read cycle time or the write cycle time.

6. The circuit of claim 5, wherein the circuit extends neither the read cycle time nor the write cycle time.

7. The circuit of claim 1, wherein the write and read pulses of the write and read bus systems are electrical signals having two states, wherein each state is defined by a voltage range, wherein a pulse in a first of the two states is "active" and a pulse in the second of the two states is "inactive";

wherein the first latching means includes means for passing its first plurality of data input signals to its first plurality of data outputs when the write pulse is active, and means for latching its first plurality of data input signals to its first plurality of data outputs when the write pulse changes from an active state to an inactive state;

wherein the second latching means includes means for preventing passing of its second plurality of data input signals to its second plurality of data outputs when either (1) the write pulse is active or
(2) the read pulse is active, but only if
 (a) the read pulse has entered the active state while the write pulse was in the active state, or
 (b) the read pulse has entered the active state substantially close to the time the write pulse changed from the active state to the inactive state; and wherein the second latching means includes means for latching its second plurality of data input signals to its second plurality of data output signals when the write pulse changes from an inactive state to an active state.

8. The circuit of claim 1, wherein said control signal is applied to said second plurality of clock inputs of the second latching means for controlling the passing and latching of the second latching means, wherein the write pulse, read pulse and control signal are electrical signals each having two states where each state is defined by a voltage range, wherein the logic means includes means responsive to the control signal beginning to change from a first to a second state in response to the write pulse changing states and operative for a period of time thereafter for preventing the event of the read pulse changing states to cause the control pulse to go back to the first state.

9. The circuit of claim 8, wherein the logic means includes two latches arranged in cascade, wherein the output of a first of the two latches is connected to the input of the second latch, whereby the first latch will latch up before the output of the second latch changes.

10. The circuit of claim 8, wherein the preventing means includes logic gates having switch points at predetermined values.

11. The circuit of claim 8, said circuit further comprising said logic means comprising:

a first NOR gate comprising first and second inputs and an output, wherein the write pulse is connected to the first input and the read pulse is connected to the second input;

a first SR flip-flop comprising an S-input and an R-input and a Q output, wherein the output of the first NOR gate is connected to the S-input and the write pulse is connected to the R-input; and a second SR flip-flop comprising an S-input and an R-input and a Q output, wherein the Q output of the first SR flip-flop is connected to the S-input of the second SR flip-flop, wherein the write pulse is connected to the R-input of the second SR flip-flop, and wherein the Q output of the second SR flip-flop comprises the control signal connected to the second latching means.

12. The circuit of claim 11, said circuit further comprising said logic means further comprising:

said first SR flip-flop comprising second and third NOR gates, wherein each NOR gate comprises two inputs and an output, wherein the second input of the second NOR gate is connected to the output of said first NOR gate, wherein the first input of the second NOR gate is connected to the output of the third NOR gate, wherein the output of the second NOR gate is connected to the second input of the third NOR gate, wherein the first input of the third NOR gate is the R-input of the first SR flip-flop, wherein the output of the third NOR gate is the Q output of the first SR flip-flop; and said second SR flip-flop comprising fourth and fifth NOR gates, wherein each NOR gate comprises two inputs and an output, wherein the second input of the fifth NOR gate is the R-input of the second SR flip-flop, wherein the first input of the fifth NOR gate is the output of the fourth NOR gate, wherein the output of the fifth NOR gate is the second input of the fourth NOR gate, wherein the first input of the fourth NOR gate is the S-input of the second SR flip-flop and wherein the output of the fifth NOR gate is the Q output of the second SR flip-flop.

13. The circuit of claim 12, said circuit further comprising one or more of the switch points of the inputs of the NOR gates set at predetermined values such that the first SR flip-flop will latch up before the control signal changes to a new state.

14. The circuit of claim 13, said circuit further comprising the switch points of the NOR gates to be at a standard value, except for the switch point of the first input of the second NOR gate whose switch point is at a value below the standard value, and the switch point of the first input of the fourth NOR gate whose switch point is at a value above the standard value.

15. The circuit of claim 14, said circuit further comprising the switch point of the first input of the fifth NOR gate set at a value below the standard value.

16. The circuit of claim 1, said circuit further comprising means for providing a data ready signal to the plurality of inputs of the read bus system to indicate that valid data is latched at the second plurality of data outputs of the second latching means, whereby the read bus system comprises means responsive to said data ready signal for generating the read pulse.

17. The circuit of claim 1, said circuit further comprising means for providing a data overrun signal to the plurality of inputs of the read bus system to indicate that data has been lost.

18. The circuit of claim 17, said circuit further comprising an overrun reset input from the read bus system so that the data overrun signal can be forced to a predetermined value.

19. The circuit of claim 1, said circuit further comprising means for providing a system reset input from the read bus system so that the circuit signals can be forced to predetermined values.

20. The circuit of claim 1, said circuit further comprising buffer means connected between the second plurality of outputs and the read bus system, wherein the buffer means comprises means responsive to the read pulse to selectively isolate the second plurality of data output signals from, or make the second plurality of data output signals available to, the read bus system.

21. A system for transferring data between a first read/write bus system, having a first plurality of inputs and a first plurality of outputs, and a second read/write bus system having a second plurality of inputs and a second plurality of outputs, wherein each of said first and said second read/write bus systems includes means for providing a write pulse to said system for indicating a write operation therefrom, and means for providing a read pulse to said system for indicating a read operation thereto, said system comprising:

logic means connected to receive said write pulse and said read pulse from each of said first and second bus systems for generating a control signal that is derived exclusively from said write and read pulses;

a first latching means having a first plurality of data inputs communicating with said first read/write bus system, a first plurality of clock inputs connected to receive said write pulse, and a first plurality of data outputs, wherein the first latching means is responsive to the write pulse for latching and passing data from said first plurality of data inputs to the first plurality of data outputs; and a second latching means having a second plurality of data inputs communicating with said first latching means, a second plurality of clock inputs connected to receive said control signal, and a second plurality of data outputs communicating with said second read/write bus system, wherein the second latching means is responsive to said control signal for latching and passing data from said second plurality of data inputs to said second plurality of data outputs.

22. The circuit of claim 21, said circuit further comprising means for providing a data ready signal to the second plurality of inputs of the second read/write bus system to indicate that valid data is latched at the second plurality of data outputs of the second latching means, whereby the second read/write bus system comprises means responsive to said data ready signal for generating the read pulse.

23. The circuit of claim 21, said circuit further comprising means for providing a data overrun signal to the second plurality of inputs of the second read/write bus system to indicate that data has been lost.

24. The circuit of claim 23, said circuit further comprising an overrun reset input from the second read/write bus system so that the data overrun signal can be forced to a predetermined value.

25. The circuit of claim 21, said circuit further comprising means for providing a system reset input from the second read/write bus system so that the circuit signals can be forced to predetermined values.

26. A bi-directional system for transferring data between a first read/write bus system, having a first plurality of inputs and a first plurality of outputs, and a second read/write bus system having a second plurality of inputs and a second plurality of outputs, wherein said first read/write bus system includes means for providing a first write pulse to said system for indicating a write operation therefrom, and means for providing a first read pulse to said system for indicating a read operation thereto, and wherein said second read/write bus system includes means for providing a second write pulse to said system for indicating a write operation therefrom, and means for providing a second read pulse to said system for indicating a read operation thereto, said system comprising:

first logic means connected to receive said first write pulse and said second read pulse for generating a first control signal that is derived exclusively from said first write pulse and said second read pulse;

second logic means connected to receive said second write pulse and said first read pulse for generating a second control signal that is derived exclusively from said second write pulse and said first read pulse;

a first latching means having a first plurality of data inputs communicating with said first read/write bus system, a first plurality of clock inputs connected to receive said first write pulse, and a first plurality of data outputs, wherein the first latching means is responsive to the first write pulse for latching and passing data from said first plurality of data inputs to the first plurality of data outputs;

a second latching means having a second plurality of data inputs communicating with said first latching means, a second plurality of clock inputs connected to receive said first control signal, and a second plurality of data outputs communicating with said second read/write bus system, wherein the second latching means is responsive to said first control signal for latching and passing data from said second plurality of data inputs to said second plurality of data outputs;

a third latching means having a third plurality of data inputs communicating with said second read/write bus system, a third plurality of clock inputs connected to receive said second write pulse, and a third plurality of data outputs, wherein the third latching means is responsive to the second write pulse for latching and passing data from said third plurality of data inputs to the third plurality of data outputs; and a fourth latching means having a fourth plurality of data inputs communicating with said third latching means, a fourth plurality of clock inputs connected to receive said second control signal, and a fourth plurality of data outputs communicating with said first read/write bus system, wherein the fourth latching means is responsive to said second control signal for latching and passing data from said fourth plurality of data inputs to said fourth plurality of data outputs.

27. The circuit of claim 26, said circuit further comprising:

means for providing a first data ready signal to the first plurality of inputs of the first read/write bus system to indicate that valid data is latched at the fourth plurality of data outputs of the fourth latching means, whereby the first read/write bus system comprises means responsive to said first data ready signal for generating the first read pulse; and means for providing a second data ready signal to the second plurality of inputs of the second read/write bus system to indicate that valid data is latched at the second plurality of data outputs of the second latching means, whereby the second read/write bus system comprises means responsive to said second data ready signal for generating the second read pulse.

28. The circuit of claim 26, said circuit further comprising:

means for providing a first data overrun signal to the first plurality of inputs of the first read/write bus system to indicate that data has been lost; and means for providing a second data overrun signal to the second plurality of inputs of the second read/write bus system to indicate that data has been lost.

29. The circuit of claim 28, said circuit further comprising:

a first overrun reset input from the first read/write bus system so that the first data overrun signal can be forced to a predetermined value; and a second overrun reset input from the second read/write bus system so that the second data overrun signal can be forced to a predetermined value.

30. The circuit of claim 26, said circuit further comprising:

means for providing a first system reset input from the first read/write bus system so that the circuit signals can be forced to predetermined values; and means for providing a second system reset input from the second read/write bus system so that the circuit signals can be forced to predetermined values.

* * * * *